(12) United States Patent
Katsumoto

(10) Patent No.: US 6,501,730 B1
(45) Date of Patent: Dec. 31, 2002

(54) CARRIER RECOVERY IN DAB RECEIVERS

(75) Inventor: Hiroshi Katsumoto, Hachiouji (JP)

(73) Assignee: Kabushiki Kaisha Kenwood, Tokyo (JP)

( * ) Notice: Subject to any disclaimer, the term of this patent is extended or adjusted under 35 U.S.C. 154(b) by 0 days.

(21) Appl. No.: 09/424,263

(22) PCT Filed: May 12, 1998

(86) PCT No.: PCT/JP98/02087

§ 371 (c)(1),
(2), (4) Date: Nov. 19, 1999

(87) PCT Pub. No.: WO98/54875

PCT Pub. Date: Dec. 3, 1998

(30) Foreign Application Priority Data

May 28, 1997 (JP) .............................................. 9-153136

(51) Int. Cl.[7] .............................................. H04L 27/06
(52) U.S. Cl. ........................ 370/208; 370/210; 370/203
(58) Field of Search ................................ 370/203, 208, 370/209, 210, 516, 517, 484, 485, 503, 350; 375/316, 332, 340, 344, 324, 329, 330, 375; 455/313, 257, 264; 329/346, 347

(56) References Cited

U.S. PATENT DOCUMENTS

| | | | | |
|---|---|---|---|---|
| 5,541,965 A | * | 7/1996 | Daffara | 375/326 |
| 5,566,211 A | * | 10/1996 | Choi | 375/332 |
| 5,584,068 A | * | 12/1996 | Mohindra | 455/324 |
| 5,793,250 A | * | 8/1998 | Fukushi | 329/207 |
| 5,946,292 A | * | 8/1999 | Tsujishita | 370/204 |
| 6,067,332 A | * | 5/2000 | Taura | 375/344 |
| 6,151,369 A | * | 11/2000 | Ohkubo | 375/332 |
| 6,219,334 B1 | * | 4/2001 | Sato | 370/210 |
| 6,233,292 B1 | * | 5/2001 | Van Bezzooijen | 375/344 |
| 6,341,123 B1 | * | 1/2002 | Tsujishita | 370/210 |

FOREIGN PATENT DOCUMENTS

| | | |
|---|---|---|
| EP | 0 606 941 A1 | 7/1994 |
| GB | 2 313 527 A | 11/1997 |

OTHER PUBLICATIONS

M. Luise et al., "Carrier Frequency Acquistion and Tracking for OFDM Systems", IEEE Transactions on Communications, vol. 44, No. 11, Nov. 1996, pp. 1590–1598.

T. Keller, et al., "Orthogonal Frequency Division Multiplex Synchronisation Techniques for Wireless Local Area Networks", IEEE International Symposium on Personal, Indoor and Mobile Radio Communications, Oct. 15, 1996, pp. 963–967.

L. Zhenhong et al., "An All–Digital Frequency Synchronization Scheme for OFDM Systems", 8th IEEE International Symposium on Personal, Indoor and Mobile Radio Communications, Sep. 4, 1997, pp. 327–331.

* cited by examiner

Primary Examiner—Douglas Olms
Assistant Examiner—Ricardo M. Pizarro
(74) Attorney, Agent, or Firm—Eric J. Robinson; Robinson Intellectual Property Law Office PC

(57) ABSTRACT

A receiver is provided which can perform normal reception even under strict environments such as multi-path environments. A frequency offset detector detects a frequency offset amount in accordance with a phrase reference symbol. The detected frequency offset value is integrated by an integrated by an integrator. The integrated value is compared by a comparator with a predetermined threshold value range. If the integrated value output from the integrator is the threshold value range, a frequency offset value amount detected by another frequency offset detector in accordance with a phase difference of a delay —detection output is selected by a switch circuit. If the integrated value is not in the threshold value range, the frequency offset value detected by the frequency offset detector is selected by the switch circuit. In accordance with each selected frequency offset value, automatic frequency control of the receiver is performed.

5 Claims, 2 Drawing Sheets

CARRIER RECOVERY IN DAB RECEIVERS

BACKGROUND OF THE INVENTION

1. Field of the Invention

The present invention relates to a receiver for receiving digital audio broadcasting signals, and more particularly to a receiver equipped with a demodulator for demodulating a signal modulated through orthogonal frequency division multiplex (hereinafter described also as OFDM).

2. Description of the Related Art

EP-A-0 606941 and M. Lusie et al.: "Carrier Frequency Acquisition and Tracking for OFDM Systems", IEEE Translation on Communication, Vol.44 No.11, November 1996 disclose a conventional demodulator for demodulating a signal modulated through OFDM. In such conventional demodulator shown in FIG. 2, an OFDM-modulated reception signal is supplied to an input terminal, frequency-converted by a mixer 1, and A/D converted by an A/D converter 2. The A/D converted reception signal is converted into I/Q data of a baseband by an I/Q detector (orthogonal detector) 3, which I/Q data is supplied to a fast Fourier transform circuit (hereinafter described as an FFT circuit) 4. The FFT circuit 4 Fourier-transforms and converts the input time domain signal into a frequency domain signal. An output from the FFT circuit 4 is supplied to a delay/detection unit 6 and to a frequency offset detector 40. The delay/detection unit 6 detects the input signal through one-symbol delay and outputs the demodulated data via an output terminal.

The frequency offset detector 40 detects a frequency offset amount in accordance with a phase reference symbol contained in the input signal. The detected frequency offset amount is D/A converted by a D/A converter 41 and supplied to a voltage controlled oscillator 9 which functions as a local oscillator. In accordance with the detected and D/A converted frequency offset amount, the oscillation frequency of the voltage controlled oscillator 9 is controlled to correct a frequency shift, so that the output of the voltage controlled oscillator 9 with the frequency shift being corrected, is supplied to the mixer 1 for the frequency conversion.

The conventional receiver described above is, however, associated with some problem that normal signal reception may become unable under multi-path reception environments, because of a large amount of a detected frequency offset.

SUMMARY OF THE INVENTION

It is an object of the present invention to provide a receiver capable of normal signal reception even under severe reception environments such as multi-path reception environments.

According to one aspect of the present invention, a receiver with a demodulator which A/D converts a reception signal, discrete-Fourier-transforms the A/D converted signal, and delay-detects the discrete-Fourier-transformed data, is provided which comprises: first frequency offset detecting means for detecting a frequency offset value of an input signal to the demodulator in accordance with a phase reference symbol contained in the discrete-Fourier-transformed data; second frequency offset detecting means for detecting a frequency offset value of the input signal to the demodulator in accordance with a phase difference of the delay-detected signal; an integrator for integrating the frequency offset value detected by the first frequency offset detecting means; and selecting means for comparing an output of the integrator with a predetermined first range of threshold values, selecting the frequency offset value detected by the second frequency offset detecting means if the output of the integrator is in the first threshold value range, and selecting the frequency offset value detected by the first frequency offset detecting means if the output of the integrator is not in the first threshold value range, wherein automatic frequency control is performed in accordance with the frequency offset value selected by the selecting means.

According to the receiver of this invention, the frequency offset value detected by the first frequency offset detecting means and integrated by the integrator is compared with the first threshold value range. If an output of the integrator is in the first threshold value range, the frequency offset value detected by the second frequency offset detecting means is selected, whereas if the output of the integrator is not in the first threshold value range, the frequency offset value detected by the first frequency offset detecting means is selected. In accordance with each selected frequency offset value, the automatic frequency control is performed.

The receiver of this invention further comprises: comparing means for comparing a predetermined second range of threshold values with the frequency offset value detected by the first frequency offset detecting means; and loading means for loading a predetermined value in the integrator if it is judged from a comparison by the comparing means that the frequency offset value detected by the first frequency offset detecting means is in the second threshold value range and if the selecting means selects the frequency offset value detected by the first frequency offset detecting means.

In the case of the receiver of the invention provided with the loading means, if the frequency offset value detected by the first frequency offset detecting means is in the second threshold value range and the frequency offset value detected by the first frequency detecting means is selected for automatic frequency control, then the frequency offset value detected by the first frequency detecting means can be switched at once to the frequency offset value detected by the second frequency detecting means. Therefore, frequent switching can be avoided which may otherwise be caused by external disturbances.

The receiver of this invention further comprises: comparing means for comparing a predetermined third range of threshold values narrower than the second threshold value range, with the frequency offset value detected by the first frequency offset detecting means; and clearing means for clearing the integrator if it is judged from a comparison by the comparing means that the frequency offset value detected by the first frequency offset detecting means continues in the second threshold value range during a predetermined period.

In the case of the receiver of the invention provided with the clearing means, automatic frequency control can be maintained by the frequency offset value detected by the second frequency offset detecting means, even if instantaneous noises are generated. Therefore, the automatic frequency control will not be switched by instantaneous noises to the frequency offset value detected by the first frequency offset detecting means.

DETAILED DESCRIPTION OF THE PREFERRED EMBODIMENT

Figure 1:
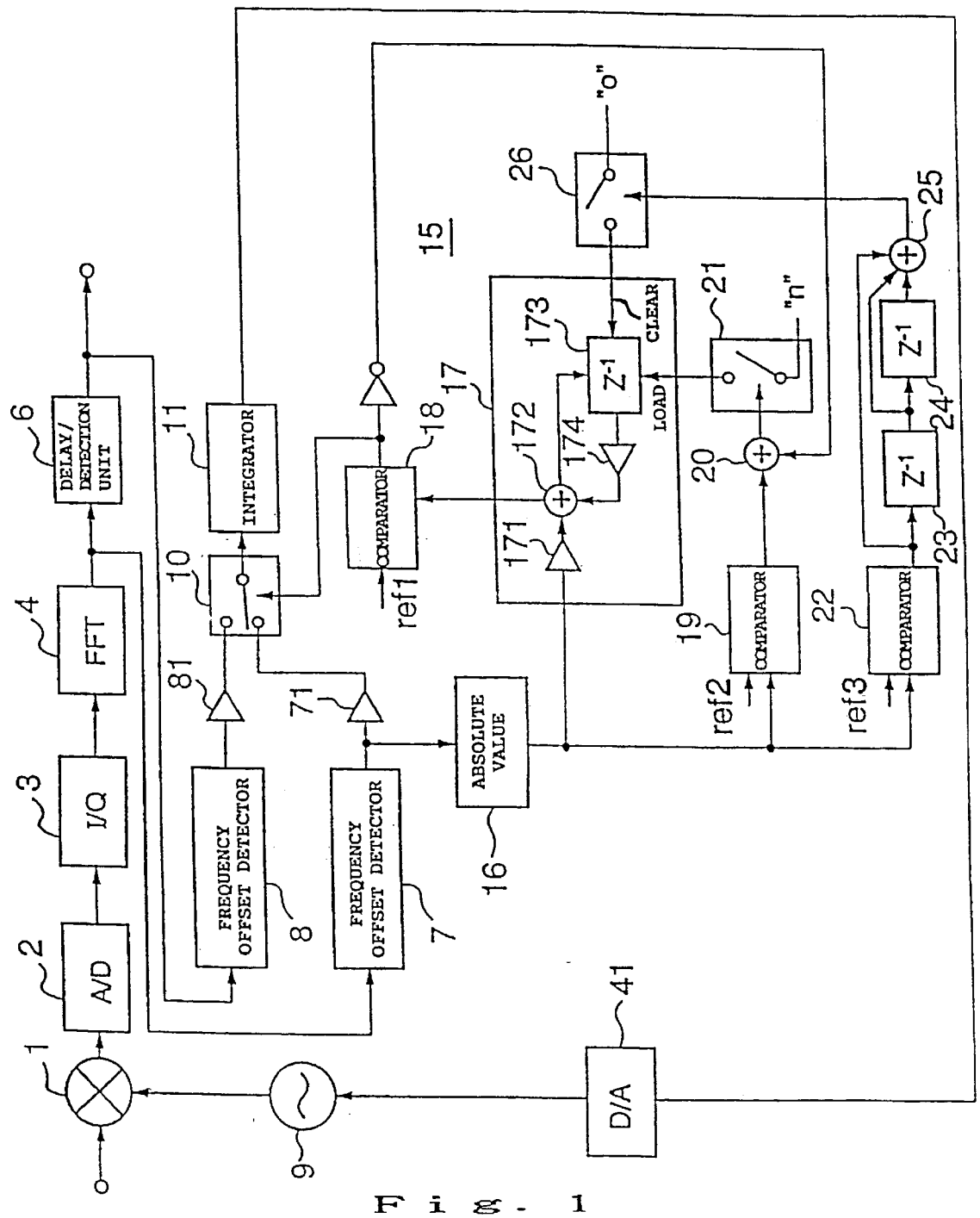
FIG. 1 is a block diagram showing the structure of the main parts of a receiver according to an embodiment of the present invention.
Figure 2:
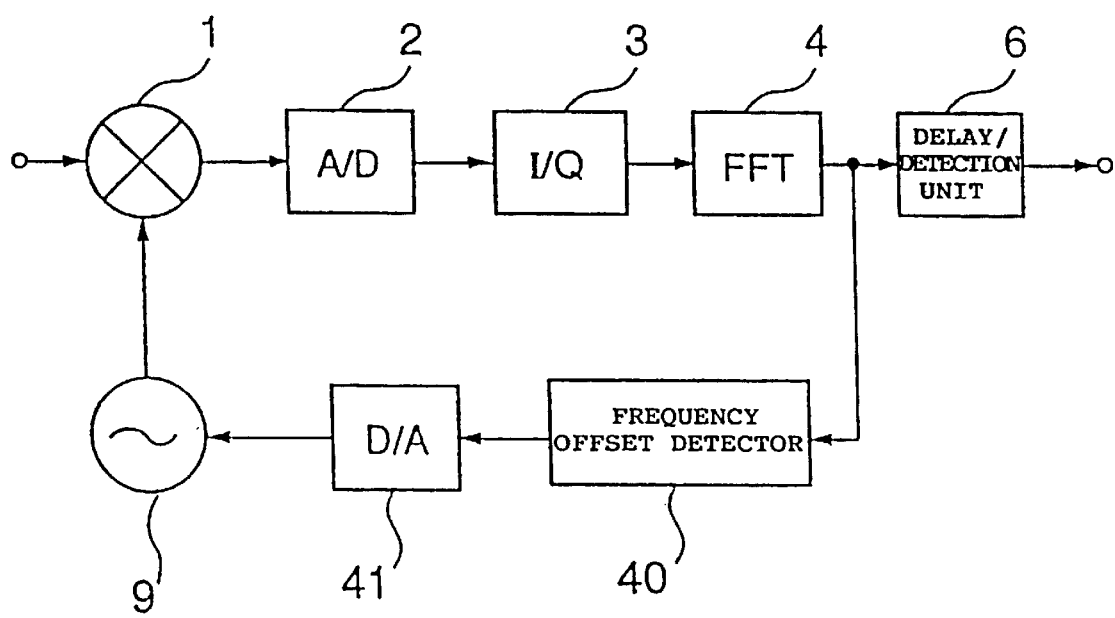
FIG. 2 is a block diagram showing the structure of the main parts of a conventional receiver.

A receiver according to an embodiment of the present invention will be described. FIG. 1 is a block diagram showing the structure of the main parts of a receiver according to an embodiment of the invention.

In the receiver of this embodiment, a reception signal is frequency-converted into an intermediate frequency signal by a mixer 1 in cooperation with a voltage controlled oscillator 9 functioning as a local oscillator. The intermediate frequency signal is converted into a digital signal by an A/D converter 2. The intermediate frequency signal converted into a digital signal is supplied to an I/Q detector (orthogonal detector) 3 which converts the input signal into I/Q data of a baseband. The output I/Q data is supplied to an FFT circuit 4.

The FFT circuit 4 forms windows for the input data in accordance with the number of points of FFT, and Fourier-transforms the input data in the unit of window, to thereby convert the input time domain signal into a frequency domain signal. An output from the FFT circuit 4 is supplied to a delay/detection unit 6 which outputs data demodulated through delay-detection via an output terminal. The output from the FFT circuit 4 is also supplied to a frequency offset detector 7. The data demodulated through delay-detection is also supplied to a frequency offset detector 8.

The frequency offset detector 7 detects a frequency offset amount in accordance with a reference symbol contained in the output from the FFT circuit, and outputs the frequency offset amount data. The frequency offset detector 8 detects a phase of the data demodulated through delay-detection by the delay/detection unit 6 and supplied therefrom, and calculates a difference between the detected phase and the phase without the frequency offset to detect a frequency offset amount.

The frequency offset amount data detected by the frequency offset detector 7 is multiplied by k by a coefficient multiplier 71 and supplied to a switch circuit 10. The frequency offset amount data detected by the frequency offset detector 8 is multiplied by p (p<k) by a coefficient multiplier 81 and supplied to the switch circuit 10. The frequency offset amount data output from the switch circuit 10 is integrated by an integrator 11. An output of the integrator 11 is D/A converted by a D/A converter 41 and supplied as a frequency control voltage to the voltage controlled oscillator 9 to control the oscillation frequency thereof and correct a frequency shift. An output of the voltage controlled oscillator 9 with the frequency shift being corrected is supplied to the mixer 1 for the frequency conversion.

The switch circuit 10 is controlled by an output from a switch controller 15. In the switch controller 15, an absolute value circuit 16 calculates an absolute value of the frequency offset amount data detected by the frequency offset detector 7. An output of the absolute value circuit 16 is integrated by an integrator 17. An integrated output from the integrator 17 is compared by a comparator 18 with a first predetermined range of first threshold values (ref 1). If the output from the integrator 17 is outside of the first threshold value range, the comparator 18 outputs a high level signal in accordance with which the output from the frequency offset detector 7 is supplied to the integrator 11. On the other hand, if the output from the integrator 17 is in the first threshold value range, the comparator 18 outputs a low level signal in accordance with which the output from the frequency offset detector 8 is supplied to the integrator 11.

The integrator 17 for integrating an output of the absolute value circuit 16 is constituted of: a coefficient multiplier 171 for multiplying an output of the absolute value circuit 16 by a coefficient a; an adder 172 which uses as its one input the output from the coefficient multiplier 171 and supplies an integrated value output from the integrator 17 to the comparator 18; a delay unit 173 for delaying an output of the adder 172 by a period of one frame cycle; and a coefficient multiplier 174 for multiplying an output of the delay unit 173 by a coefficient (1-a) and supplying its output to the adder 172 as its other input. The coefficients a, and (1-a) are used for multiplication operations by the coefficient multipliers 171 and 174, to provide a proper integration coefficient not to overflow an output of the integrator 17.

Also in the switch controller 15, an output of the absolute value circuit 16 is compared by a comparator 19 with a second predetermined range of threshold values (ref 2: e.g., $+\pi/10$ radian to $-\pi/10$ radian). If an output of the absolute value circuit 16 is outside of the second threshold value range, the comparator 19 outputs the high level signal, whereas if an output of the absolute value circuit 16 is in the second threshold value range, the comparator 19 outputs the low level signal. A logical sum calculator 20 calculates a logical sum of an output of the comparator 19 and an inverted output of the comparator 18. Only when an output of the logical sum calculator 20 takes the low level signal, a predetermined value n is loaded, as a value one frame cycle before, via a switch 21 to the delay unit 173 in place of the value stored in the delay unit 173.

Also in the switch controller 15, an output of the absolute value circuit 16 is compared by a comparator 22 with a third predetermined range of threshold values (ref 3: e.g., $+\pi/50$ radian to $-\pi/50$ radian). If an output of the absolute value circuit 16 is outside of the third threshold value range, the comparator 22 outputs the high level signal, whereas if an output of the absolute value circuit 16 is in the third threshold value range, the comparator 22 outputs the low level signal. An output of the comparator 22 is delayed by a delay unit 23 by a period of one frame cycle, and an output of the delay unit 23 is further delayed by a delay unit 24 by a period of one frame cycle. An output of the comparator 22 and outputs of the delay units 23 and 24 are added together by an adder 25. Only when an output of the adder 25 takes the low level signal, a value stored in the delay unit 173 is cleared by a switch 26.

The operation of the receiver of this embodiment constructed as above will be described by taking as an example the case wherein the modulation method uses OFDM ($\pi/4$-DQPSK) of the European specifications for digital audio broadcasting signals.

In accordance with the phase reference symbol contained in an input signal, the frequency offset detector 7 detects a frequency offset amount and outputs corresponding frequency offset amount data. The output data of the frequency offset detector 7 is multiplied by the coefficient k by the coefficient multiplier 71 and selectively output by the switch circuit 10 to the integrator 11. In accordance with the phase of the QPSK symbol subjected to delay-detection by the delay/detection unit 6, the frequency offset detector 8 detects a frequency offset amount. The output data of the frequency offset detector 8 is multiplied by the coefficient p by the coefficient multiplier 81 and selectively output by the switch circuit 10 to the integrator 11.

With delay-detection, a phase difference per 1.2 ms (OFDM symbol length in a transmission mode) of each QPSK symbol is detected. If there is a frequency shift, the output of the delay/detection unit 6 contains a phase offset corresponding to a frequency shift so that the frequency offset amount can be calculated from the phase offset amount. By representing a real part, in an FIC (fast information channel), of an output from the delay/detection unit 6 by "Re" and by representing an imaginary part thereof by "Im", the phase $\Phi(\omega)$ can be represented by "arc tan (Im/Re)". A phase angle error Err($\omega$) can be represented by Err($\omega$)=$Re^2$ −$Im^2$ if Re·Im$\geq$0 and by Err($\omega$)=$Im^2$ −$Re^2$ if Re·Im<0.

In DQPSK modulation, a delay-detection output of one symbol is represented by ($\pi/4$+n·$\pi/2$ radian). For example, if n=0 (if a delay-detection output is in the first quadrant) and there is no phase angle error, then the phase angle of the delay-detection output is ($\pi/4$ radian) and $Im^2$−$Re^2$=0. If there is a phase angle error, the phase angle error or frequency shift error is a difference ($Im^2$−$Re^2$). Therefore, the frequency offset detected by the frequency offset detector 8 is in a range of ($\pi/8$ to −$\pi/8$ radian).

In the receiver of this embodiment, the absolute value of frequency offset amount data supplied from the frequency offset detector 7 is calculated by the absolute value circuit 16 whose output is integrated by the integrator 17. If the integrated output is in the first threshold value range (e.g., +$\pi/8$ to −$\pi/8$ radian), an output of the comparator 18 causes the switch circuit 10 to select an output of the frequency offset detector 8 to thereby realize automatic frequency control. This state corresponds to a locked state of automatic frequency control.

If the output of the absolute value circuit 16 integrated by the integrator 17 is outside of the first threshold value range, an output of the comparator 18 causes the switch circuit 10 to select an output of the frequency offset detector 7 to thereby realize automatic frequency control. Specifically, if the comparator 18 detects a frequency offset amount causing a large phase angle error outside of the range (+$\pi/8$ to −$\pi/8$ radian), an output of not the frequency offset detector 8 but the frequency offset detector 7 is selected to perform automatic frequency control.

Conversely, if the absolute value of the frequency offset amount detected by the frequency offset detector 7 and integrated by the integrator 17 is in the first threshold value range, an output of not the frequency offset detector 7 but the frequency offset detector 8 is selected. Specifically, if the comparator 18 detects a frequency offset amount causing a phase angle error in the range (+$\pi/8$ to $\pi/8$ radian), an output of not the frequency offset detector 7 but the frequency offset detector 8 is selected to perform automatic frequency control.

As the output of the integrator 17 enters the first threshold value range, the switch circuit 10 changes its output from the frequency offset detector 7 to that from the frequency offset detector 8. In this case, only if the output of the absolute value circuit 16 is in the second threshold value range (+$\pi/10$ to −$\pi/10$ radian) and the inverted output of the comparator 18 takes the low level signal, i.e., the output data of the frequency offset detector 7 is selected by the switch circuit 10, then the predetermined value n is loaded in the delay unit 173 by the switch 21.

This predetermined value n is set to such a small value that when it is added even while the frequency offset amount is small, an output of the frequency offset detector 8 is selected at once, and when it is added while the frequency offset amount is large, an output of the frequency offset detector 7 is remained to be selected. As a result, even if this predetermined value n is loaded in the delay unit 173 while the output of the absolute value circuit enters the second threshold value range because of a reduced frequency offset amount and while an output of the frequency offset detector 7 is selected by the output of the comparator 18, the output of the frequency offset detector 8 is locked immediately by the switch circuit 10 and an output of the frequency offset detector 7 is remained to be selected even if the predetermined value n is added because of an increased frequency offset amount. In this manner, unstable switching to be otherwise caused by external disturbance can be avoided.

The output of the frequency offset detector 7 is multiplied by the coefficient k whereas the output of the frequency offset detector 8 is multiplied by the coefficient R (p<k), so that the substantial gain of the frequency offset detector 7 is lowered. However, for example, the output of the integrator 17 may instantaneously increase under the conditions in excess of a guard interval, a condition where an obstructive signal reflected from a mountain enters and the gain of the frequency offset detector 7 changes abruptly, or under other conditions. In such a case, the switch circuit 19 selects instantaneously an output of the frequency offset detector 7 and thereafter selects an output of the frequency offset detector 8. Therefore, the lock state may be released by the phase angle error caused by an addition of the predetermined value n and obstructive signal, and even if the lock state is restored, an output of the frequency offset detector 7 is selected again.

However, with the receiver of this embodiment, if an output of the absolute value circuit 16 continues to remain in the second threshold value range during a period of three frame cycles, an output of the adder 25 takes the low level signal so that the value stored in the delay unit 173 is cleared by the switch 26. Therefore, even if the phase angle error increases instantaneously, since the delay unit 173 is cleared during the lock-in state, the lock-in state will not be released and the voltage controlled oscillator 9 continues to be controlled in accordance with an output of the frequency offset detector 8.

Furthermore, the third threshold value range is set narrower than the second threshold value range. Therefore, the time when the comparator 22 takes the low level signal is sufficiently later than the time when the comparator 19 takes the low level signal. In addition, the delay unit 173 is cleared if the low level signal of the comparator 22 continues during the period of three frame cycles. Accordingly, the delay unit 173 is cleared only when the control of the voltage controlled oscillator 9 by the output of the frequency offset detector 7 completely changes to the control of the voltage controlled oscillator 9 by the output of the frequency offset detector 8.

With the receiver of this embodiment, therefore, after the oscillation frequency of the voltage controlled oscillator 9 is once controlled and locked in to the reception frequency in accordance with the frequency offset amount supplied from the frequency offset detector 8, the control by the frequency offset detector 8 is not performed and a stable broadcasting reception is possible, the control by the frequency offset detector 8 having a possibility of erroneous detection of a frequency offset amount caused by multi-paths.

The absolute value circuit 16 may be omitted, but use of this circuit reduces erroneous detection of a frequency offset amount. Whether the low level signal of the comparator 22 continues during the period of three frame cycles and the delay unit 173 is to be cleared, may be detected by using a counter. A change in the transmission mode of digital audio broadcasting signals can be dealt with by changing the coefficients a and (1-a) of the coefficient multipliers 171 and 174. The above functions of the receiver of this embodiment may be realized by using a digital signal processor or the like.

As described so far, the receiver of the invention is advantageous in that it can perform normal broadcasting signal reception even under strict reception environments such as multi-path reception environments.

What is claimed is:

1. A receiver with a demodulator comprising a A/D converter for converting a reception analog signal to a digital signal, a I/Q detector for deriving I/Q data from the digital signal, a discrete-Fourier-transformer for discrete-Fourier-transforming the derived I/Q data, and a delay-detector for detecting the discrete-Fourier-transformed data,

CHARACTERIZED BY first frequency offset detecting means (7) for detecting a frequency offset value of an input signal to the demodulator in accordance with a phase reference symbol contained in the discrete-Fourier-transformed data;

second frequency offset detecting means (8) for detecting a frequency offset value of the input signal to the demodulator in accordance with a phase difference of the delay-detected signal;

an integrator (17) for integrating the frequency offset value detected by said first frequency offset detecting means; and selecting means (10) for comparing an output of said integrator with a predetermined first range of threshold values, selecting the frequency offset value detected by said second frequency offset detecting means if the output of said integrator is in the first threshold value range, and selecting the frequency offset value detected by said first frequency offset detecting means if the output of said integrator is not in the first threshold value range, wherein automatic frequency control is performed in accordance with the frequency offset value selected by said selecting means.

2. A receiver according to claim 1, further comprising:

comparing means (19) for comparing a predetermined second range of threshold values with the frequency offset value detected by said first frequency offset detecting means; and loading means (20, 21) for loading a predetermined value in the integrator if it is judged from a comparison by said comparing means that the frequency offset value detected by said first frequency offset detecting means is in the second threshold value range and if said selecting means selects the frequency offset value detected by said first frequency offset detecting means.

3. A receiver according to claim 1, further comprising:

comparing means (22) for comparing a predetermined third range of threshold values narrower than the second threshold value range, with the frequency offset value detected by said first frequency offset detecting means; and clearing means (23–26) for clearing the integrator if it is judged from a comparison by said comparing means that the frequency offset value detected by said first frequency offset detecting means continues in the second threshold value range during a predetermined period.

4. A receiver according to claim 1, further comprising:

an absolute value circuit (16) for calculating an absolute value of the frequency offset value detected by said first frequency offset detecting means, wherein an output of said absolute value circuit is supplied to the integrator in place of the frequency offset value detected by said first frequency offset detecting means.

5. A receiver according to claim 2 or 3, further comprising:

an absolute value circuit (16) for calculating an absolute value of the frequency offset value detected by said first frequency offset detecting means, wherein an output of said absolute value circuit is supplied to said comparing means in place of the frequency offset value detected by said first frequency offset detecting means.

* * * * *